Patented Apr. 13, 1943

2,316,219

UNITED STATES PATENT OFFICE 2,316,219

COMPOSITION FOR CLEANING ALUMINUM

Robert H. Brown, New Kensington, and Robert B. Mears, Oakmont, Pa., assignors to Aluminum Company of America, Pittsburgh, Pa., a corporation of Pennsylvania No Drawing. Application April 22, 1939, Serial No. 269,488

3 Claims. (Cl. 252—136)

This invention relates to an improved cleaning agent. More particularly, it relates to a non-abrasive acid cleaning composition which may be packaged in solid form and dissolved in water for use.

While cleaning compositions having acid reactions are known in the art, most of them are liquid in form. For that reason, they require careful handling and must be packaged in the more expensive containers designed to hold such substances; these containers may be broken during shipping or handling, and great damage may then be caused by their acid contents. Moreover, such liquid acid compositions occupy substantial storage space.

The object of this invention is to provide a novel cleaning composition in dry or solid form which may easily be handled and packaged. More particularly, the object is to provide such a composition having an acid reaction. The specific object of the invention is to provide a non-abrasive cleaning composition which may be packaged in dry form and used in an aqueous solution for cleaning the surfaces of aluminum or aluminum alloy articles. Other objects will appear in the following description of the invention.

We have found that stains and discolorations are very readily removed from the surfaces of articles by immersing said article in a hot aqueous solution containing metaphosphoric acid in suitable concentration, depending upon the nature of the articles being cleaned. Metaphosphoric acid is solid and may be packaged in powdered or in granular form until ready for use. Then, since it is water-soluble, the metaphosphoric acid may be dissolved in water at a temperature near its boiling point to provide a cleaning medium which is sufficiently acid in reaction to be effective, yet not so violent as to attack and mar the surfaces of the articles being cleaned. Metaphosphoric acid has particular value in the cleaning of aluminum or its alloys, and is particularly effective in removing discolorations from the surfaces of aluminum kitchen utensils, barrels, dairy equipment, and other articles of aluminum or aluminum alloy.

While metaphosphoric acid is sufficiently active to remove discolorations from the surfaces of aluminum and other articles, it may be desirable to increase its effectiveness in this respect. This may be done by using with the metaphosphoric acid an additional substance adapted to increase the acid reaction of the aqueous solution. The additional substance also should be solid in form in order that it may be packaged with the metaphosphoric acid, and it should be soluble in water so that it may be dissolved in the aqueous solution. We prefer to use sulfamic acid as the additional acid substance. Other acids or acid salts also may be used to advantage, among them being the alkali metal acid sulfates, the alkali metal acid phosphates, and the alkali metal acid fluorides, ammonium compounds of these substances being especially effective. A cleaning composition containing metaphosphoric acid and an alkali metal acid phosphate is claimed in our copending application Serial No. 269,489; filed April 22, 1939. In addition, we have found that tartaric acid may be used with this additional substance where it is desirable that the cleaning solution should work with even greater effect. Tartaric acid also is solid and water-soluble and may be packaged in dry form with metaphosphoric acid and any of the substances above named.

Instead of using a substance with metaphosphoric acid which increases the acidity of the solution, the additional solid, water-soluble substance may be a neutral compound capable of dissolving in the aqueous metaphosphoric acid solution and reacting in water to form an acid which will etch the particular material being cleaned. For example, in the cleaning of aluminum, sodium fluoride in a metaphosphoric acid cleaning composition dissolves in water to form hydrofluoric acid which supplements the cleaning effect of the metaphosphoric acid.

The addition of wetting agents, such as certain of the alkyl sulfonates, also may be profitable, since cleaning may be effected in their presence with a smaller amount of metaphosphoric acid and additional substances in the salts. The particular wetting agent used should be determined by the nature of the object being cleaned.

In the practice of one embodiment of the invention we have used 50 grams of metaphosphoric acid and 25 grams of sulfamic acid dissolved in one liter of water, the solution being heated to near 100° C. This composition removes the discoloration from aluminum articles very readily. The time during which the articles are immersed in the solution depends upon the extent to which their surfaces are tarnished, but in most cases a 5-minute treatment results in the removal of all stains and leaves their surfaces clean with a slightly frosted appearance.

Although the invention has been described with reference to the cleaning of aluminum, and although it has particular value when used for removing discoloration from the surfaces of that metal, it may be employed for cleaning other materials as well.

We claim:

1. A process for cleaning the surfaces of articles of aluminum, which comprises subjecting said surfaces to the action of a hot aqueous solution of a composition consisting substantially of an alkali metal fluoride and metaphosphoric acid, the latter being the major component and the principal active cleansing agent.

2. A dry water-soluble aluminum-surface cleanser for use in aqueous solution, said cleanser being characterized by an acidic cleansing reaction in said solution and consisting substantially of an alkali metal fluoride and metaphosphoric acid, the latter being the major component and the principal active cleansing agent.

3. A dry water-soluble aluminum-surface cleanser for use in aqueous solution, said cleanser being characterized by an acidic cleansing reaction in said solution and consisting substantially of sodium fluoride and metaphosphoric acid, the latter being the major component and the principal active cleansing agent.

ROBERT H. BROWN.
ROBERT B. MEARS.